(12) United States Patent
Elliott

(10) Patent No.: US 7,421,257 B1
(45) Date of Patent: Sep. 2, 2008

(54) RECEIVER SCHEDULING IN AD HOC WIRELESS NETWORKS

(75) Inventor: Brig Barnum Elliott, Arlington, MA (US)

(73) Assignee: Stragent, LLC, Longview, TX (US)

( * ) Notice: Subject to any disclaimer, the term of this patent is extended or adjusted under 35 U.S.C. 154(b) by 938 days.

(21) Appl. No.: 10/328,566

(22) Filed: Dec. 23, 2002

Related U.S. Application Data

(63) Continuation-in-part of application No. 09/998,946, filed on Nov. 30, 2001, now Pat. No. 7,020,501.

(51) Int. Cl.
*H04Q 11/00* (2006.01)
(52) U.S. Cl. .................. 455/127.5; 455/574.1; 455/572
(58) Field of Classification Search ................. 455/522, 455/420, 38.3, 343, 517, 572, 574.1, 127.5; 370/390, 219, 221, 400, 345; 709/248, 217, 709/219, 225
See application file for complete search history.

(56) References Cited

U.S. PATENT DOCUMENTS

| | | | |
|---|---|---|---|
| 3,192,230 A * | 6/1965 | Lunsford et al. ............. 548/543 |
| 5,515,369 A | 5/1996 | Flammer, III et al. ....... 370/69.1 |
| 5,541,912 A | 7/1996 | Choudhury et al. |
| 5,583,866 A * | 12/1996 | Vook et al. ................... 370/312 |
| 5,649,119 A | 7/1997 | Kondoh et al. |
| 5,721,733 A * | 2/1998 | Wang et al. .................. 370/332 |
| 5,974,327 A | 10/1999 | Agrawal et al. |
| 6,000,011 A | 12/1999 | Freerksen et al. |
| 6,052,779 A * | 4/2000 | Jackson et al. .................. 713/2 |
| 6,067,301 A | 5/2000 | Aatresh |
| 6,094,435 A | 7/2000 | Hoffman et al. |
| 6,208,247 B1 * | 3/2001 | Agre et al. ............. 340/539.19 |
| 6,272,567 B1 | 8/2001 | Pal et al. |
| 6,292,508 B1 * | 9/2001 | Hong et al. .................. 375/134 |
| 6,381,467 B1 * | 4/2002 | Hill et al. ..................... 455/519 |
| 6,414,955 B1 * | 7/2002 | Clare et al. .................. 370/390 |
| 6,492,904 B2 * | 12/2002 | Richards .................. 340/539.1 |
| 6,505,052 B1 * | 1/2003 | Jou ............................. 455/466 |
| 6,564,074 B2 * | 5/2003 | Romans ...................... 455/574 |
| 6,633,753 B1 * | 10/2003 | Kido ........................ 455/343.2 |
| 6,694,149 B1 * | 2/2004 | Ady et al. .................... 455/522 |
| 6,697,649 B1 * | 2/2004 | Bennett et al. .............. 455/574 |
| 6,721,273 B1 | 4/2004 | Lyon |
| 6,748,451 B2 * | 6/2004 | Woods et al. ............... 709/248 |
| 6,760,584 B2 * | 7/2004 | Jou ............................ 455/434 |
| 6,789,196 B1 * | 9/2004 | Miyano ...................... 713/189 |
| 6,807,163 B1 * | 10/2004 | Shi ............................ 370/337 |
| 6,977,895 B1 | 12/2005 | Shi et al. |
| 7,020,701 B1 | 3/2006 | Gelvin et al. |

(Continued)

OTHER PUBLICATIONS

Liu, J. et al. Simulation Modeling of Large-Scale Ad-hoc Sensor Networks. European Simulation Interoperability Workshop, Univ. of Westminster, London. Jun. 25-27, 2001. 12 pages.

(Continued)

*Primary Examiner*—Duc Nguyen
*Assistant Examiner*—Julio R Perez
(74) *Attorney, Agent, or Firm*—Zika-Kotab, PC

(57) ABSTRACT

A wireless network (100) includes a communications node (120) configured to periodically generate and transmit at least one reception definition. Each reception definition indicates a time and manner in which the node will operate to receive information messages.

29 Claims, 8 Drawing Sheets

U.S. PATENT DOCUMENTS

2001/0029178 A1* 10/2001 Criss et al. .................. 455/419
2003/0012168 A1   1/2003 Elson et al.
2003/0066090 A1* 4/2003 Traw et al. .................. 725/114
2003/0119568 A1* 6/2003 Menard ...................... 455/572

OTHER PUBLICATIONS

Liu, Y. et al. A Bluetooth Scatternet-Route Structure for Multihop Ad Hoc Networks. IEEE Journal on Selected Areas in Communications. 21:2, 229-239 (Feb. 2003).

Van Dyck, R.E. et al. Distributed Sensor Processing Over an Ad Hoc Wireless Network: Simulation Framework and Performance Criteria. NIST, May 2001.

Clare, L.P. et al. Self-Organizing Distributed Sensor Networks. University of California Los Angeles/Rockwell Science Center, 9 pages (print date Mar. 7, 2001).

Doherty, Lance. Algorithms for Position and Data Recovery in Wireless Sensor Networks. University of California at Berkeley, 54 pages. Mar. 7, 2001 (print date).

Office Action dated Nov. 2, 2007, U.S. Appl. No. 10/786,335.

Office Action dated Nov. 16, 2007, U.S. Appl. No. 10/649,030.

* cited by examiner

RECEIVER SCHEDULING IN AD HOC WIRELESS NETWORKS

CROSS-REFERENCE TO RELATED APPLICATIONS

The present application is a continuation-in-part of copending, commonly assigned U.S. patent application Ser. No. 09/998,946, filed Nov. 30, 2001, the entire contents of which are incorporated by reference herein.

BACKGROUND OF THE INVENTION

A. Field of the Invention

The present invention relates generally to wireless communications networks and, more particularly, to receiver scheduling in ad hoc wireless communications networks.

B. Description of the Related Art

Conventionally, an ad hoc wireless network includes a variable number of communications nodes, each node being equipped with a communications transceiver for conveying information messages throughout the network. While some nodes in the network are capable of performing network routing functions, other nodes serve exclusively as sources or destinations for data traffic. These two types of nodes are commonly referred to, respectively, as routers and endpoints. During network operation, these routers and endpoints execute predefined algorithms and adhere to established networking protocols, which together enable the nodes to find one another, determine preferred paths through the network for data traffic, and detect and repair ruptures in the network as communication path characteristics change over time, or as nodes move, fail, experience changes in battery power, etc.

Certain ad hoc wireless networks employ a scheme known as receiver scheduling to conserve power in some or all of the network nodes, or to make it more difficult for adversaries (e.g., hackers in a civilian context, or enemies in a military context) to monitor and disrupt network operation. In such receiver scheduling schemes, node receivers are selectively and intermittently turned off for some fraction of the total time that the overall network is operational. Consequently, each node is available and operating to receive information messages only during prescribed periods, and some form of receiver scheduling is employed to ensure that the various network nodes are in agreement as to when they can transmit information messages to one another.

Conventionally, receiver scheduling is accomplished using some form of Time Division Multiple Access, or TDMA, plan. While there are many variants of TDMA receiver scheduling, all such schemes share a common basic principle. Specifically, such TDMA plans divide network operating time into a number of predefined time slots and, during each time slot, certain network nodes are appointed to power up their receivers to accept incoming information messages. By sharing a common reference clock, as well as a common receiver appointment schedule, all of the nodes in the network are informed as to when they are able to successfully transmit messages to neighboring nodes.

Typically, all of the nodes in such a network are preconfigured with a single, network-encompassing TDMA receiver schedule. Alternatively, each node can transmit its own particular TDMA receiver schedule to other nodes during network operation. For example, a node can generate its own TDMA receiver schedule at run time using a pseudo-random number generator, or PRNG, and then transmit a corresponding PRNG seed to neighboring nodes (since, assuming all nodes are in agreement as to how to construct a TDMA receiver schedule from a PRNG stream, a single PRNG seed unambiguously defines a unique TDMA receiver schedule).

While these methods do achieve the stated goal of providing receiver scheduling in ad hoc wireless networks, they also have certain drawbacks. For example, in each of the above mentioned TDMA schemes, the start times and durations of the TDMA time slots are fixed. Consequently, each node is restricted with respect to the start times and durations of its reception intervals. Such rigidity inevitably results in inefficiencies, as message transmission intervals are not always precise multiples of a time slot, and thus portions of time slots sometimes go unused. Moreover, the fixed nature of the time slots can aid adversaries in attempts to monitor and disrupt network operation (i.e., the start times and durations of the time slots are not variables with which an adversary must contend). As a result, a need exists for a more flexible, efficient, and robust receiver scheduling scheme.

SUMMARY OF THE INVENTION

Systems and methods consistent with the present invention address this and other needs by having nodes in an ad hoc wireless network continually generate and broadcast next, or pending, portions of their respective receiver schedules.

In accordance with the purpose of the invention as embodied and broadly described herein, a wireless network includes a node that periodically generates and transmits at least one reception definition. Each reception definition indicates a time and manner in which the node will be available and operating to receive information messages.

In another implementation consistent with the present invention, a node including a memory and a processor is disclosed. The processor generates a local receiver schedule including a number of reception definitions, periodically modifies the local receiver schedule, and transmits the prevailing local receiver schedule together with information messages bound for other nodes in the network.

In yet another implementation consistent with the present invention, a method for performing receiver scheduling at a node in a wireless network is disclosed. The method includes generating a local receiver schedule at the node, the local receiver schedule including a number of reception definitions. Each reception definition indicates a time and manner in which the node will operate to receive information messages from other nodes in the network. The method further includes periodically updating the local receiver schedule at the node, and periodically transmitting a most recently updated local receiver schedule from the node to other nodes in the network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Generally, ad hoc wireless networks according to the invention include nodes that continually generate and broadcast next, or pending, portions of their respective receiver schedules. In exemplary embodiments, network nodes transmit these pending schedules along with data traffic to other nodes in the network, and each node maintains a local receiver schedule database, including its own pending receiver schedule, as well as any pending receiver schedules received from other network nodes. To speed the dissemination of receiver schedule information throughout the network, nodes can transmit not only their own pending receiver schedules, but also those pending receiver schedules received from other network nodes.

Since the pending receiver schedules for the various nodes are independently generated, continually updated, and rapidly disseminated, each node is free to set its receiver schedule without consideration for any predefined time slot plan. Consequently, embodiments of the invention provide flexible and efficient communications, as each network node can dynamically adjust the amount of time its receiver is on and available. For example, a node can adjust its receiver duty cycle based on the type of activity the node is performing, the prevailing data traffic rate, the number of other nodes within communication range, etc. Additionally, each node can adjust the duration of individual reception intervals to accommodate transmissions of varying length (e.g., shorter control packets or longer data packets). Advantageously, such flexibility in reception interval duration also makes it more difficult for adversaries to monitor and jam communications. This is particularly true when, as is described hereinafter, pseudo-random techniques are used to establish start times and channels for the reception intervals.

EXEMPLARY SYSTEM

Figure 1:
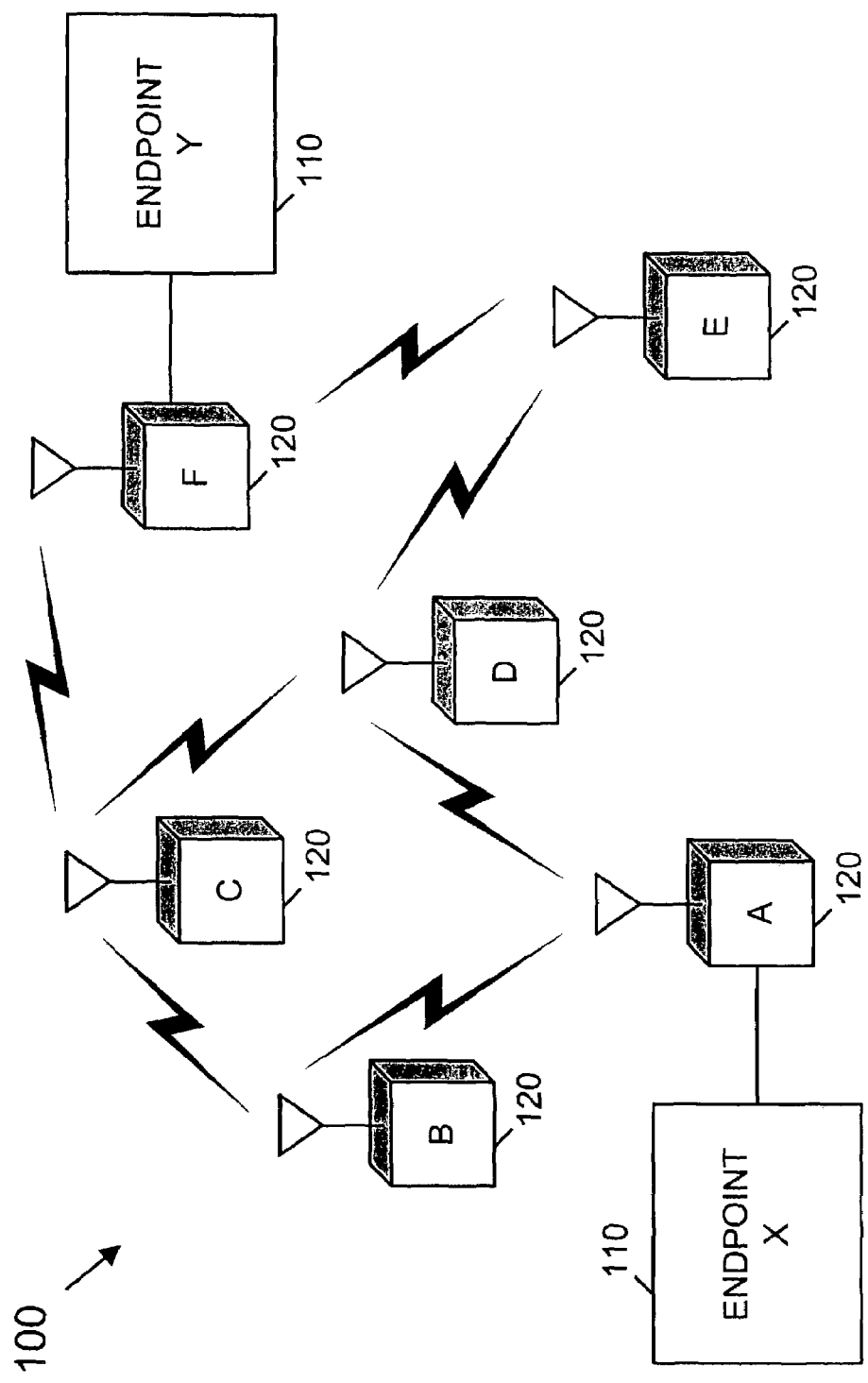
FIG. 1 depicts an exemplary ad hoc wireless network in which systems and methods consistent with the present invention may be implemented.

FIG. 1 is a diagram of an exemplary network 100 in which systems and methods consistent with the present invention can be implemented. As shown, network 100 can include a number of endpoint devices 110, as well as a number of intermediary nodes 120. Endpoint devices 110 can, for example, include various known devices, such as mainframe computers, minicomputers, workstations, personal computers, laptops, personal digital assistants, mobile telephones, handheld radios, or the like, capable of exchanging information with other devices. Additionally, intermediary nodes 120 can, for example, include various known devices, such as ground, airborne, underwater, and/or satellite based transceivers (employing. radio, infrared, microwaves, acoustics, etc.), or the like, capable of passing or forwarding information from one device to another. Although, for sake of simplicity, two endpoint devices 110 and six intermediary nodes 120 are shown in FIG. 1, it will be understood that exemplary network 100 can in fact include any number of endpoint devices 110 and any number of intermediary nodes 120. It will also be appreciated that, although all endpoint devices 110 and intermediary nodes 120 appear stationary in FIG. 1, some or all endpoint devices 110 and intermediary nodes 120 can be, and often are, mobile in practice.

In operation, endpoint devices 110 (also referred to hereinafter as source and/or destination devices) communicate with one another by transmitting information messages via intermediary nodes 120 (also referred to hereinafter as relays or routers). For example, as is shown in FIG. 1, a first endpoint device 110, labeled X, can exchange information messages with a second endpoint device 110, labeled Y, via a communication path including any or all of six intermediary nodes 120, labeled A through F. As is well known in the art, the information messages can be conveyed, for example, by way of data and control packets, and the precise path (i.e., the particular chain of intermediary nodes 120) used to convey any given packet, or collection of packets, can be determined via routing algorithms operating within intermediary nodes 120. As is also well known in the art, such algorithms can, for example, adapt to accommodate node movements, node failures, changes in the physical communication paths between intermediary nodes 120, etc.

A network such as that depicted in FIG. 1 is often referred to in the art and hereinafter as an ad hoc wireless network. The descriptor "wireless" is used to indicate the fact that communication between intermediary nodes 120 is typically, though not always, via wireless links. Additionally, the descriptor "ad hoc" is used to indicate the highly flexible and portable nature of the network. In other words, because the nodes in such a network are typically mobile and thus able, indeed often expected, to intermittently join and leave the network, the network can be quickly established in a particular place, at a particular time, and for a particular purpose, and then just as quickly disband when necessary or desired.

It will be appreciated, however, that these aspects of exemplary network 100 of FIG. 1 are not requisite for operation of the receiver scheduling techniques of the present invention. For example, for purposes of the present invention, any or all of the various endpoint devices 110 and intermediary nodes 120 of network 100 can be stationary or mobile. Additionally, the link between any two intermediary nodes 120, as well as that between any endpoint device 110 and any intermediary node 120, can be wired, wireless, optical, etc. Moreover, while the endpoint devices 110 and intermediary nodes 120 are shown as separate devices in FIG. 1, it will be appreciated that in certain implementations, an endpoint device 110 can also perform the functions of an intermediary node 120, and vice versa. Accordingly, and as will be appreciated by those of ordinary skill, the invention is not limited to any specific hardware configuration.

Figure 2:
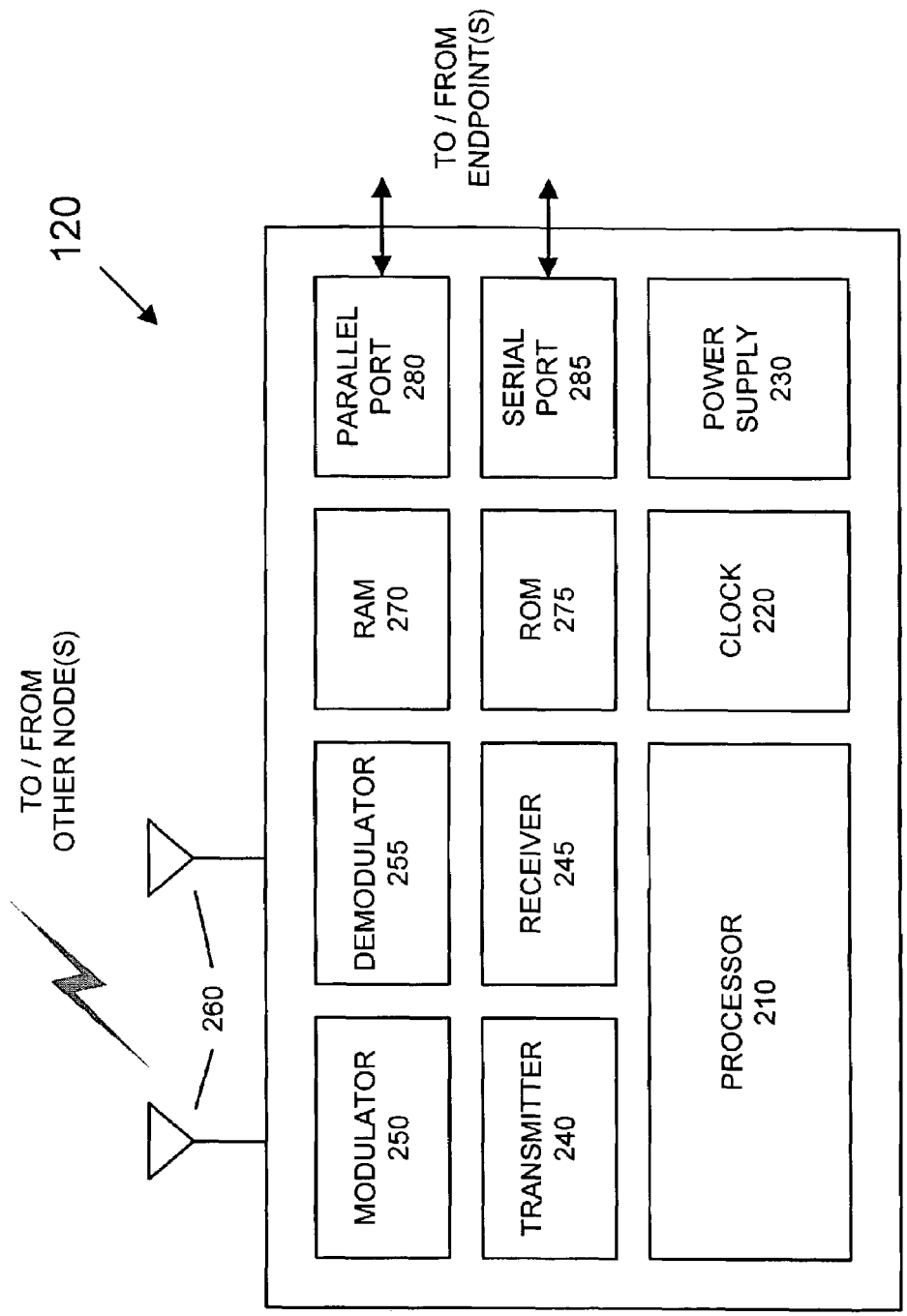
FIG. 2 depicts an exemplary node, according to embodiments of the present invention, for use in the wireless network of FIG. 1.

FIG. 2 is an exemplary diagram of an intermediary node 120 according to one implementation consistent with the present invention. As shown, node 120 can include a processor 210, a clock 220, a power supply 230, a transmitter 240, a receiver 245, a radio frequency (RF) modulator 250, a RF demodulator 255, RF antennae 260, a random access memory (RAM) 270, a read only memory (ROM) 275, a parallel communications port 280, and a serial communications port 285. As is well known, these components can be connected via one or more communication buses (not shown) and configured in any number of known ways to accomplish transmission, reception, and processing of information packets.

For example, processor 210 can include any type of conventional processor or microprocessor that interprets and executes instructions, and clock 220 can include any type of conventional timing circuitry for tracking a current time used in transmitting and receiving packets. Alternatively, processor 210 can include one or more application specific integrated circuits, as well as combinational logic, or the like, and clock 220 can include one or more counters and/or a global positioning system (GPS) receiver to provide a local time base that is synchronized with time bases used by other network components.

Power supply 230 can include conventional transformer/rectifier/filter circuitry, or the like, for providing power to the various components of node 120. Additionally, or in the alternative, power supply 230 can include a portable generator, a battery, fuel cell, or the like, for providing power in mobile contexts. Where power supply 230 includes a battery, the battery can be rechargeable, and any known recharging mechanism can be used (e.g., solar power).

Transmitter 240 and receiver 245 can utilize conventional wireless techniques to communicate packets to and from other devices (e.g., to and from other nodes 120) via, respectively, RF modulator 250 and RF demodulator 255 (RF modulator 250 and RF demodulator 255 being coupled to RF antennae 260). For example, transmission and reception can be accomplished using any known time, frequency, or code division multiple access scheme (e.g., any known TDMA, FDMA, CDMA, ultrawideband (UWB) communication technique or any combination thereof). While transmitter 240 and receiver 245 are shown as separate components in FIG. 2, it will be appreciated that they can instead take the form of a single transceiver. It will also be appreciated that RF antennae 260 can include any directional, multi-directional, or omni-directional antenna or antenna array.

RAM 270 can include a conventional RAM device or any other known dynamic storage device that stores information and/or instructions for use by processor 210. Additionally, ROM 275 can include a conventional ROM device or any other known static storage device that stores information and/or instructions for use by processor 210. Instructions used by processor 210 can also, or alternatively, be stored in any other known computer-readable medium, including one or more memory devices.

Communications ports 280, 285 can, for example, utilize known forms of wired communication to enable exchange of information packets between node 120 and other devices (e.g., an endpoint device 110). For example, parallel port 280 can provide a standard Ethernet connection, and serial port 285 can provide a standard RS-232 or USB connection. Alternatively, communications ports 280, 285 can be combined in a single device and can include any known mechanism enabling the node 120 to communicate with other devices via any known type of wired, wireless, or optical link.

From the foregoing description, it will be apparent that, although they are not all shown in FIG. 2, a variety of known component configurations are consistent with the present invention. For example, as is well known in the art, node 120 can include dual partitions (e.g., dual processors, dual transceivers, etc.) separated by one or more cryptographic units to provide added security (e.g., in certain military applications). Additionally, hardwired circuitry can be used in place of, or in combination with, software instructions to implement processes consistent with the present invention. Accordingly, and as will be appreciated by those of ordinary skill, the present invention is not limited to any specific hardware and/or software configuration.

During node operation, processor 210 works in conjunction with certain of the other node components (e.g., clock 220, transmitter 240, receiver 245, and communications ports 280, 285) to effect the above described packet transmission, reception, and routing, as well as the hereinafter described receiver scheduling techniques of the present invention. To do so, processor 210 can, for example, execute a series of software instructions retrieved from RAM 270, or from another suitable computer-readable medium. The software instructions can be loaded into RAM 270 (or into another suitable computer-readable medium) from any other suitable computer-readable medium, such as ROM 275, or from an external device via communication ports 280, 285 or receiver 245.

Figure 3:
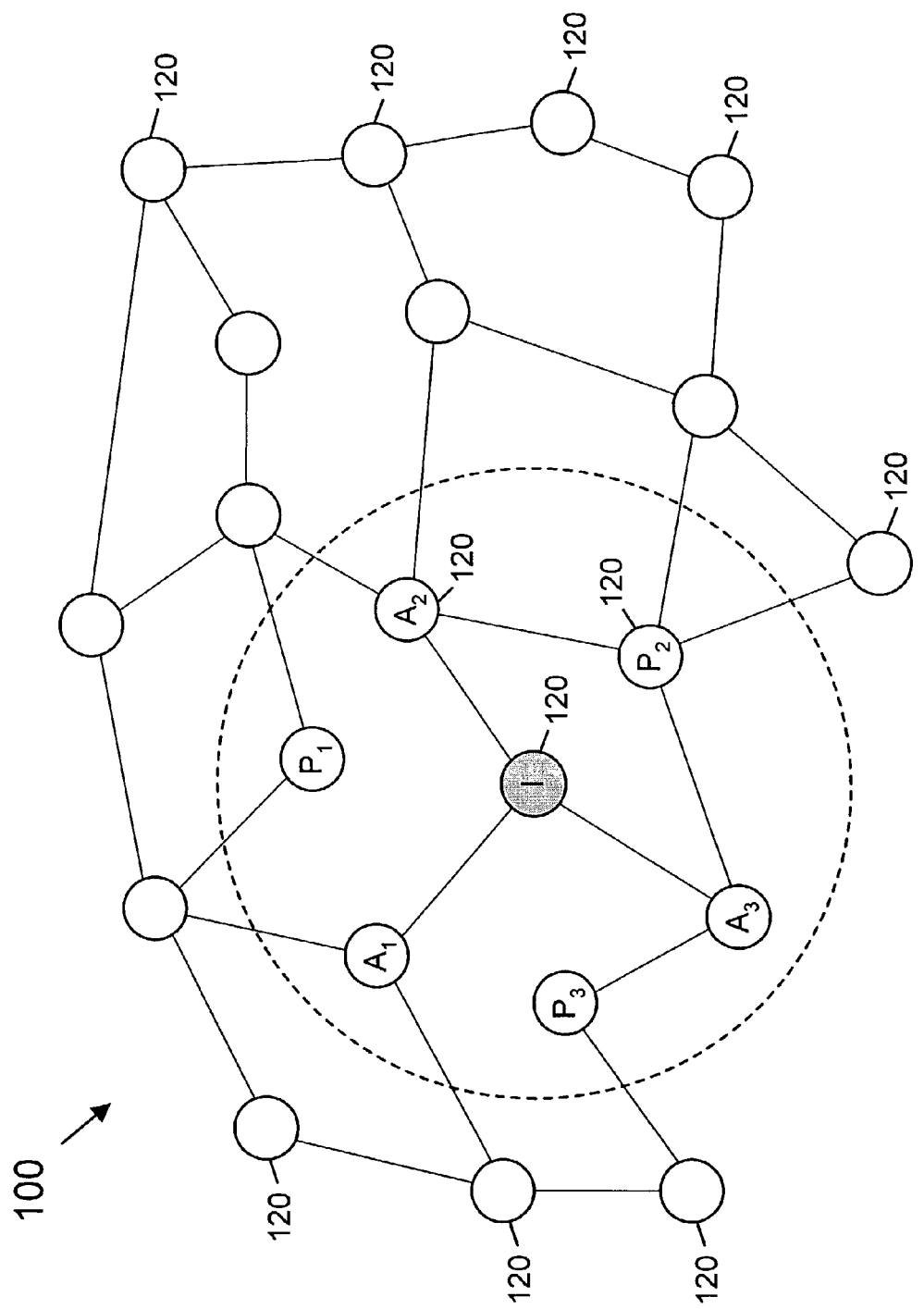
FIG. 3 depicts an effective coverage area of a node of the wireless network of FIG. 1, as well as a number of actual and potential neighboring nodes within the effective coverage area.

In order to conserve power, and/or to provide added network security, processor 210 can periodically power off receiver 245 during network operation. This practice, in combination with the fact that intermediary nodes 120 are generally free to join and leave network 100, makes it desirable, if not necessary, that active nodes 120 (i.e., those intermediary nodes 120 actually present and operating in the network at a given time) be informed as to when neighboring nodes 120 are present and available for communication. FIG. 3 illustrates this aspect of ad hoc wireless network 100 of FIG. 1.

In FIG. 3, exemplary network 100 is shown to include a large number of intermediary nodes 120, and solid lines connecting certain pairs of nodes 120 are used to indicate that the two nodes in each connected pair are aware of, and are able to communicate with, one another. A communication range of a particular intermediary node 120, labeled I in FIG. 3, is depicted as a dashed circle surrounding the particular node I. The range can, for example, represent the effective coverage area, antenna orientation, beam patterns, etc. of a radio transmitter-receiver combination such as that shown in FIG. 2. It will be appreciated, however, that the communication range will not typically be circular in practice. The precise shape of the coverage area will depend, for example, on terrain, reflections from surrounding objects, wireless interference, etc.

In FIG. 3, six neighboring nodes 120 are positioned within the communication range of the particular node I. Of these six neighboring nodes 120, only three nodes, labeled $A_1$-$A_3$, are shown to be mutually aware of, and thus able to communicate with, the particular node I (i.e., these three nodes are "actual" neighbors of the particular node I). While the remaining three neighboring nodes, labeled $P_1$-$P_3$, do fall within the communication range of the particular node I, they are not mutually aware of, and are thus unable to communicate with, the particular node I (i.e., they are merely "potential" neighbors of the particular node I). The three neighboring nodes labeled $P_1$-$P_3$ can, for example, represent nodes that have just entered and/or powered up within the communication range of the particular node I.

FIG. 3 thus demonstrates the importance of continually informing network nodes as to which neighboring nodes are available for communication. In other words, it is desirable that the particular node I be made aware of the three newly available nodes $P_1$-$P_3$, and vice versa, so that the nodes can potentially route information messages more directly and efficiently through network 100. Additionally, the particular node labeled I should be informed whenever known neighbors (e.g., the three nodes labeled $A_1$-$A_3$) power down, leave the area, or otherwise become unavailable for communication. Moreover, given that even the known and active neighbors of the particular node I can intermittently turn their receivers off as noted above, it is desirable that the particular node I be kept informed of the precise times the neighboring nodes will be available and operating to receive information messages. The present invention provides these and other advantages via novel receiver scheduling techniques described hereinafter.

Generally, receiver scheduling, according to implementations consistent with the principles of the present invention, is achieved by configuring network nodes 120 to continually generate and broadcast next, or pending, portions of their respective receiver schedules whenever nodes 120 are active and participating in the network. Each node 120 transmits pending schedule portions along with data traffic to other nodes 120, and maintains a database including its own and other pending receiver schedules. In this way, nodes 120 are kept continually abreast, not only of the arrival and departure of neighboring nodes 120, but also of the pending receiver schedules for active neighboring nodes 120. Moreover, because pending receiver schedules for different nodes 120 may be generated independently of one another and then quickly disseminated within the network, each node 120 is able to tailor its own receiver schedule in view of changing network conditions, and without regard to the restrictive time slot limitations imposed by conventional receiver scheduling techniques.

Figure 4:
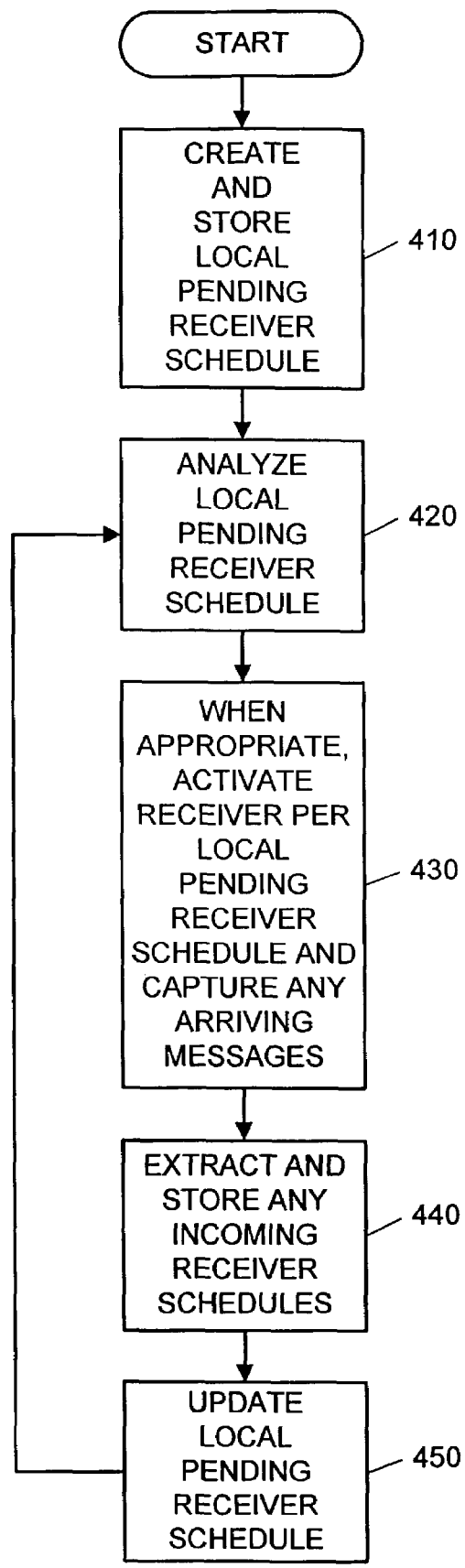
FIG. 4 is a flowchart depicting an exemplary method for developing and maintaining a local receiver schedule according to embodiments of the present invention.
Figure 5:
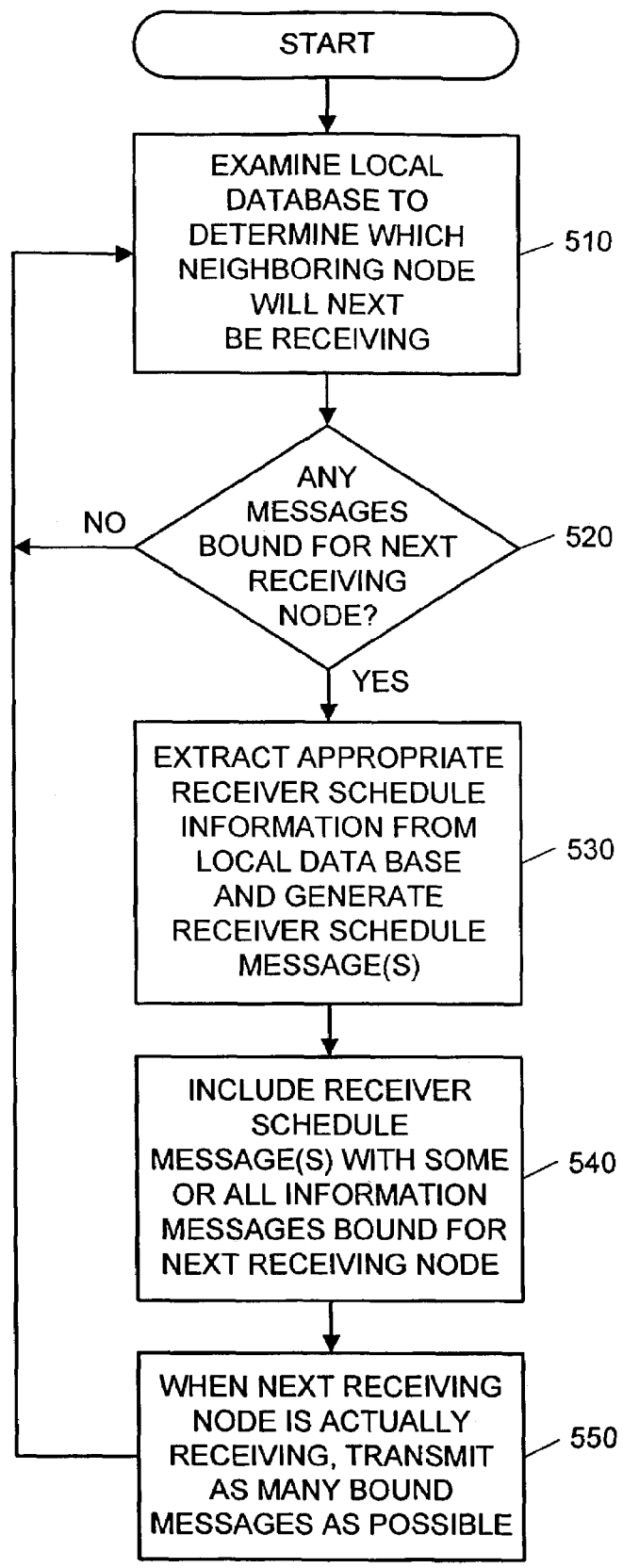
FIG. 5 is a flowchart depicting an exemplary method for disseminating local receiver schedules according to embodiments of the present invention.

FIG. 4 depicts an exemplary method, according to implementations consistent with the invention, of developing and maintaining a pending receiver schedule and a pending receiver schedule database within a node 120 of an ad hoc wireless network. Additionally, FIG. 5 depicts an exemplary method, according to implementations consistent with the invention, of disseminating receiver schedule information from such a node 120. In combination, the exemplary methods of FIGS. 4 and 5 provide a complete receiver scheduling scheme in accordance with the principles of the invention. It will be appreciated that the techniques described with respect to FIGS. 4 and 5 can be implemented using known hardware and software configurations. For example, processor 210 of FIG. 2 can carry out software instructions to perform the various acts described in FIGS. 4 and 5. Additionally, RAM 270 of FIG. 2 can be used within a network node 120 to store the receiver scheduling information generated and disseminated in the processing of FIGS. 4 and 5. As noted above, however, the present invention is not limited to any specific hardware and/or software configuration.

The processing described in FIG. 4 can, for example, be executed by a network node 120 upon joining an ad hoc wireless network such as that of FIG. 1. As shown, processing can begin with node 120 creating and storing a local pending receiver schedule (act 410). According to one implementation of the present invention, the local pending receiver schedule can include a finite number of reception definitions, where each reception definition includes a number of parameters that together indicate a specific time and manner in which node 120 will operate (e.g., power up and tune its receiver 245) to receive messages transmitted by other nodes.

In practice, the precise number and type of parameters included in each reception definition will depend upon the media and format used to transmit information messages between network nodes 120. For example, in instances where packets are transmitted using a conventional frequency-hopping format, each reception definition can include a reception starting time, a reception duration, and an appropriate carrier frequency (i.e., information indicating, by way of practical example, that reception begins in 3.85 seconds at 42.356 MHz and lasts 10 milliseconds). Since, for purposes of the present invention, any suitable medium (including radio, infrared, microwave, etc.) and any suitable format (including, TDMA, FDMA, CDMA, pulse width modulation, pulse code modulation, etc.) can be used to transmit messages between network nodes 120, it will be appreciated that a reception definition consistent with the invention can include any suitable combination of parameters that sufficiently describe a unique reception instance for a particular media and a particular format.

Additionally, the number of reception definitions included in the local pending receiver schedule can be set (and thereafter dynamically adjusted) depending, for example, upon the number of nodes 120 participating or expected to participate in the network, the prevailing or expected volume of network traffic, etc. In other words, given that the local pending receiver schedule is disseminated to other network nodes (as is described below with respect to FIG. 5), and given that there is some, albeit small, overhead associated with that dissemination, the size of the pending receiver schedule is chosen to maximize network efficiency for a given context.

According to implementations of the invention, the parameter values (i.e., the times, channels, etc.) included in each reception definition can also be set in a number of ways. For example, the parameters can be preset in node 120 or dynamically determined at node 120 during network operation based, for example, upon prevailing or predicted traffic flow at node 120, the number of neighboring nodes, the power remaining in the node battery, some or all known schedules for other nodes in the network, etc. Alternatively, where transmission security is an issue, the parameters can be set based on output of a pseudo-random number generator (PRNG), or based on some measurable physical random process (e.g., thermal noise, radioactive decay, or the like).

Once created, the local pending receiver schedule can be stored as part of a local pending receiver schedule database (e.g., in RAM 270 of FIG. 2). Thereafter, node 120 can analyze the local pending receiver schedule to determine when and how the node's receiver 245 should next be turned on and tuned to receive information messages from other network nodes 120 (act 420). For example, the first reception definition in the pending receiver schedule can be retrieved from the pending receiver schedule database, and the parameters of the retrieved reception definition can be used to control the next reception operation of node 120. Thus, at the appropriate time and in the appropriate manner (for example, as defined by the parameters of the retrieved reception definition), node 120 can power up its receiver 245, tune to the appropriate frequency, and capture any information messages being transmitted to it (act 430).

In implementations consistent with the present invention, and as is described in detail below with respect to FIG. 5, the messages received by node 120 can include pending receiver schedules for other network nodes 120. Accordingly, node 120 can extract any incoming receiver schedules and store them in the local pending receiver schedule database (e.g., for use in transmitting messages to the other nodes, as is described below with respect to FIG. 5) (act 440). Thereafter, node 120 can update its own pending receiver schedule (act 450). For example, node 120 can delete the reception definition used in act 430 from the pending receiver schedule, and append a new reception definition to the pending receiver schedule. The new reception definition can, for example, be generated using the same techniques used to generate reception definitions for the initial local receiver schedule (e.g., based on a PRNG output stream).

Additionally, it will be understood that a node may take the known schedules of other nodes into account when preparing its own next, or pending, schedule. For instance, when node 120 updates its own pending receiver schedule (act 450), node 120 may ensure that its new reception definition does not overlap or conflict with any definitions in the known schedules for other nodes in the network as recorded in the local receiver schedule database.

Once the local receiver schedule has been updated, processing can return to act 420, and the above described cycle (i.e., acts 420 to 450) can be repeated as long as node 120 is active and participating in network 100. Thus, according to the exemplary process of FIG. 4, node 120 generates and then continually updates its own pending receiver schedule, while at the same time using the prevailing receiver schedule (i.e., the current, or most recently updated, pending receiver schedule) to control reception of information messages (and any included pending receiver schedules) from other network nodes 120. The prevailing local receiver schedule can be disseminated to other nodes 120 in network 100 as is next described with respect to FIG. 5.

FIG. 5 depicts an exemplary receiver schedule dissemination process that can be executed in parallel with the exemplary process described above with respect to FIG. 4. To maintain synchronization between the processes of FIGS. 4 and 5, node 120 can, for example, execute the process of FIG. 5 once during each node reception interval (e.g., once each time node 120 executes act 430 of FIG. 4). As shown, processing can begin with node 120 examining the local pending receiver schedule database (which is developed as described above with respect to FIG. 4, and which includes pending reception definitions for neighboring nodes, as well as pending reception definitions for the node itself) to determine which neighboring node 120 will next be receiving (act 510). Node 120 can, for example, identify a next receiving node by locating a minimum, or earliest, start time across all database entries associated with neighboring nodes 120.

Once the next receiving neighbor has been established, node 120 can determine whether any information messages (e.g., any control and/or data packets) are bound for the next receiving node 120 (act 520). Node 120 can make such determination using conventional techniques (i.e., data traffic is received and queued at the node using well known traffic routing methods). If no information messages are bound for the next receiving node 120, then processing can return to act 510, where node 120 can again determine the next receiving node 120. However, if information messages are bound for the next receiving node 120, then node 120 can prepare receiver scheduling information for inclusion with some or all of the outgoing information messages (act 530).

More specifically, node 120 can create a receiver scheduling message, or RSM, using information retrieved from the local receiver schedule database. At a minimum, the RSM can include the prevailing local pending receiver schedule (developed as described above with respect to FIG. 4, and including a list of reception definitions for node 120 itself). Additionally, the RSM can include some or all of the pending receiver schedules, if any, that have been previously collected from neighboring nodes (i.e., during earlier occurrences of act 430 of FIG. 4). For example, when relatively few pending receiver schedules have been collected (which will typically be the case in smaller networks), the RSM can include the local receiver schedule database in its entirety. However, in larger networks, inclusion of the entire receiver schedule database may not be feasible. In such a case, node 120 can include a particular subset of the collected pending receiver schedules in the RSM (e.g., using random selection, round-robin selection, etc., or some form of biased selection based, for example, on a preset ranking of node importance, or on a dynamically adjusted node ranking based on observed traffic flow, path characteristics, etc.).

Once the RSM is created, node 120 can include the RSM (e.g., as part of a header) with some or all of the information messages bound for the next receiving node (act 540). Thereafter, node 120 can transmit the RSM-laden messages to the next receiving node (at an appropriate time and in an appropriate manner, as dictated by the reception definition used to identify the next receiving node at act 510). Once the messages have been transmitted, processing can return to act 510 (perhaps after waiting for the start of the next node reception at act 430 of FIG. 4), and the transmission cycle (i.e., acts 510 through 550) can be repeated.

Thus, an intermediary node 120 continually transmits its own locally-generated pending receiver schedule and, possibly, pending receiver schedules received from other nodes 120. Moreover, when each one of a network of nodes 120 executes the processing described in FIGS. 4 and 5 in combination, the result is a proliferation of up-to-date pending receiver schedules throughout the network. Consequently, it is possible, especially in smaller networks, for a newly activated node 120 to learn the prevailing receiver schedule for an entire network just by receiving a single RSM-carrying information message. Even in larger networks, very few messages are required to inform a newly activated node 120 of most or all of the already active nodes 120 in the network (i.e., since different nodes will tend to forward different subsets of pending receiver schedules, and since the newly activated node will likely receive messages from more than one neighboring node).

It should be noted that conventional beaconing techniques can be used in conjunction with the processing described in FIGS. 4 and 5 to allow a newly arriving node (i.e., a node that has yet to receive even a single RSM, and therefore knows nothing of the network it is trying to join) to successfully receive or transmit a first message. According to such beaconing techniques, all network nodes 120 transmit beacons, including receiver scheduling information, at preset or pseudo-random times. A newly arriving node 120 can thus power up its receiver 245 and listen for beacons from nearby nodes 120. Once a beacon (and the included receiver schedule information) has been received, the newly arriving node 120 can proceed to function normally in the network.

Figure 6:
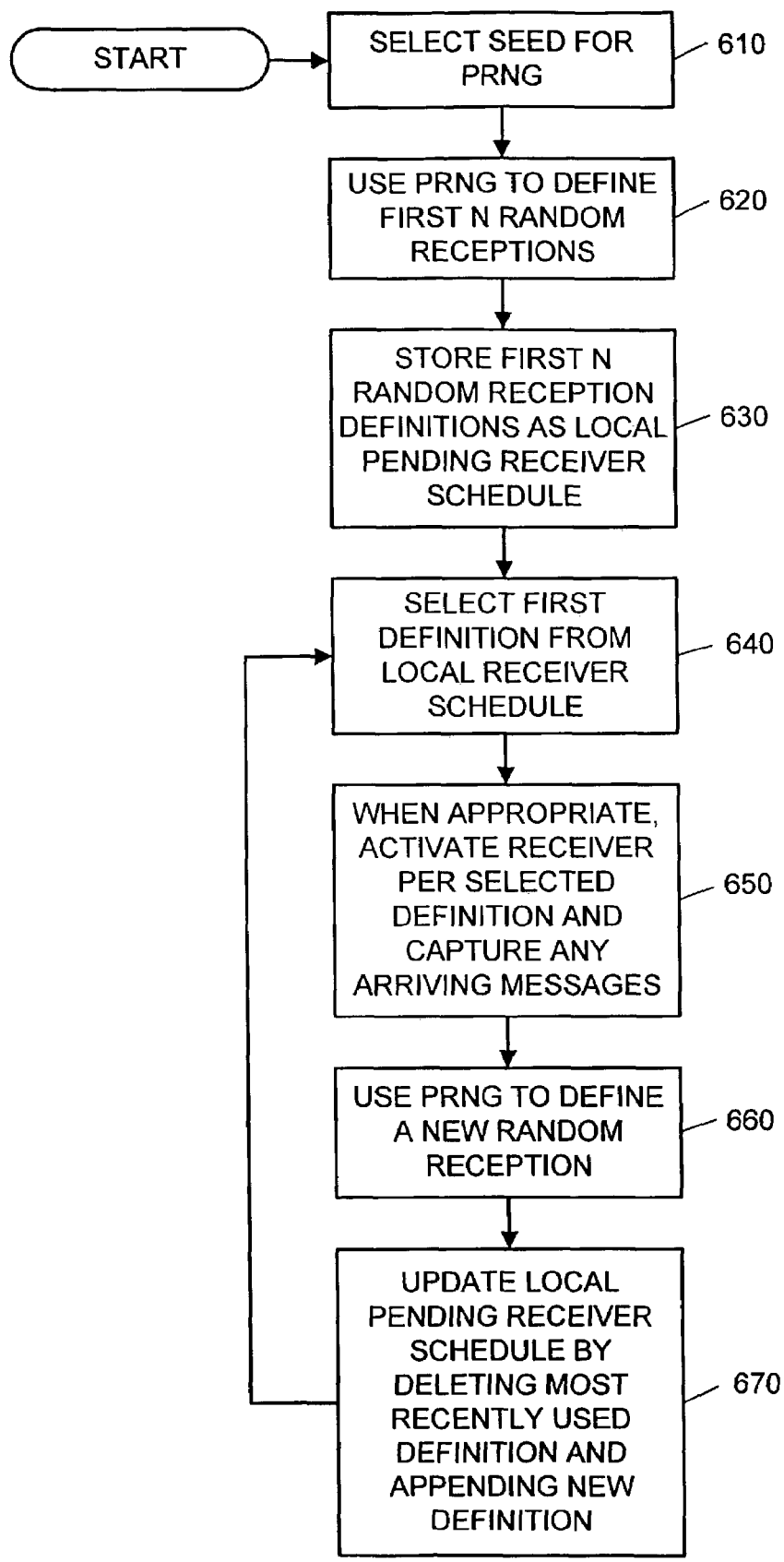
FIG. 6 is a flowchart depicting an exemplary implementation of the receiver schedule development and maintenance method of FIG. 4.

To further illuminate the various features and advantages of the receiver scheduling techniques of the present invention, FIG. 6 depicts a specific exemplary implementation of the schedule generation and maintenance processing described in FIG. 4. The exemplary implementation is intended for use in a network in which a standard frequency-hopping scheme is used to carry out communications between intermediary nodes (i.e., each transmission of an information message occurs on one of a number of preset carrier frequencies). Also, the processing of FIG. 6 presumes that it is desirable for successive transmissions to be randomized (e.g., for security purposes). Like the processing of FIG. 4, the processing of FIG. 6 can be executed within an intermediary node 120 (e.g., via processor 210 of FIG. 2), and in parallel with the dissemination processing described in FIG. 5.

In FIG. 6, processing can begin with node 120 selecting a PRNG seed using known techniques (act 610). Thereafter, node 120 can use the PRNG seed to generate a finite number N of reception definitions (act 620). More specifically, node 120 can generate a PRNG stream based on the selected PRNG seed (again using known techniques), and use the PRNG stream to establish a starting time and a carrier frequency for each of the N reception definitions. Additionally, node 120 can determine a duration for each of the N reception definitions (e.g., using the PRNG stream, or based upon observed network conditions as described above with respect to FIG. 4). As noted previously, the precise number N of reception definitions can be set, either a priori or at run time, based on expected or observed network conditions. Once the N reception definitions are established, node 120 can store them (e.g., in RAM 270 of FIG. 2) as a local pending receiver schedule for node 120 (act 630).

Thereafter, node 120 can select the first reception definition in the local pending receiver schedule to govern a next reception operation for node 120 (act 640). Thus, at an appropriate time (as indicated by the start time associated with the selected reception definition) and in an appropriate manner (as indicated by the duration and the carrier frequency associated with the selected reception definition), node 120 powers up and tunes its receiver to accept any information messages being transmitted to node 120 (act 650). As described above with respect to FIG. 4, the received information messages can include receiver schedule messages, which node 120 extracts and stores for use in transmitting messages to neighboring nodes. If the timing parameters included with the incoming receiver schedule messages are given in relative terms (e.g., a start time of x seconds indicating that the associated reception will begin x seconds after the reception definition was transmitted), then node 120 can map the incoming timing parameters to its own time base prior to storing them. Alternatively, if network nodes 120 share a common time base (e.g., via GPS receivers), then timing parameters can be given in absolute network time, and no mapping may be necessary.

Once reception of incoming messages is concluded, and once any incoming receiver schedule messages have been extracted and stored, node 120 can update the local pending receiver schedule (acts 660 and 670). More specifically, node 120 can use the PRNG stream to generate a new reception definition (i.e., a new random start time and a new random carrier frequency, as well as a new duration which can be set either randomly or strategically), and then modify the local pending receiver schedule by deleting the first reception definition (i.e., the definition just selected and used in acts 640 and 650, respectively) and appending the newly generated reception definition. Thereafter, processing can return to act 640, and the foregoing cycle (i.e., acts 640 through 670) can be repeated as long as node 120 is present and active in the network. Thus, node 120 effectively generates a rolling window of N pending reception definitions, each successive definition including a pseudo-randomly generated start time, duration, and carrier frequency.

At the same time, node 120 can disseminate this rolling window using the exemplary process described above with respect to FIG. 5. In other words, node 120 can include the prevailing N reception definitions in receiver schedule messages that are in turn included with information messages bound for other network nodes. As described in detail above, the outgoing receiver schedule messages can also include pending receiver schedules previously collected from other network nodes. Thus, a receiver schedule message for the exemplary embodiment depicted in FIG. 6 can appear as shown in FIG. 7.

Figure 7:
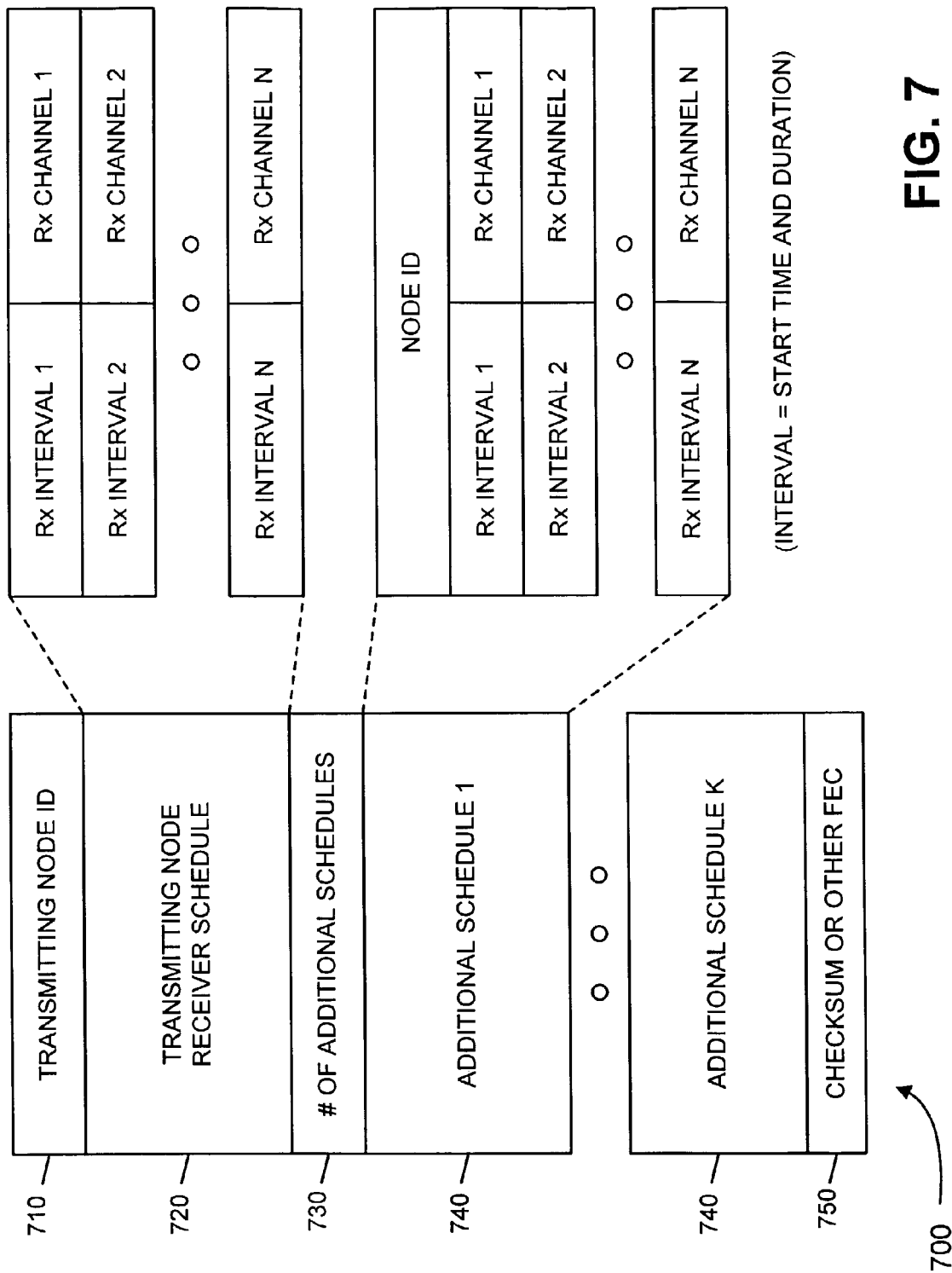
FIG. 7 depicts an exemplary receiver schedule message that can be used in conjunction with the implementation of FIG. 6.

In FIG. 7, exemplary receiver schedule message 700 can include a transmitting node identification field 710, as well as a transmitting node receiver schedule field 720. As shown, transmitting node receiver schedule 720 includes N reception definitions, each reception definition including a reception interval (i.e., a start time and a duration) and a reception channel (i.e., a carrier frequency). Additionally, the exemplary receiver schedule message 700 can optionally include an additional schedule count field 730, additional pending receiver schedule fields 740, and an error correction field 750.

Additional schedule count field 730 can indicate a number, if any, of additional pending receiver schedule fields 740 to follow. As shown, each additional pending receiver schedule 740 can include a node identification field and an associated collection of N reception definitions (each definition in turn including an associated interval and channel). Error correction field 750 can include information to ensure accurate transmission of the receiver schedule message 700. Note also that the receiver schedule message 700 can be encrypted using known techniques to provide added security (e.g., network nodes can use a shared encryption key to code and decode messages as they are transmitted and received).

Advantageously, receiver schedule message 700 can be used in the exemplary processes of FIGS. 5 and 6 to provide the above described benefits of performing receiver scheduling in accordance with the principles of the invention. For example, the pseudo-random nature of the reception start times and channels provides significant protection against network adversaries. Moreover, the reception durations can be set, for example, to accommodate varying network conditions and/or varying incoming packet lengths.

Figure 8:
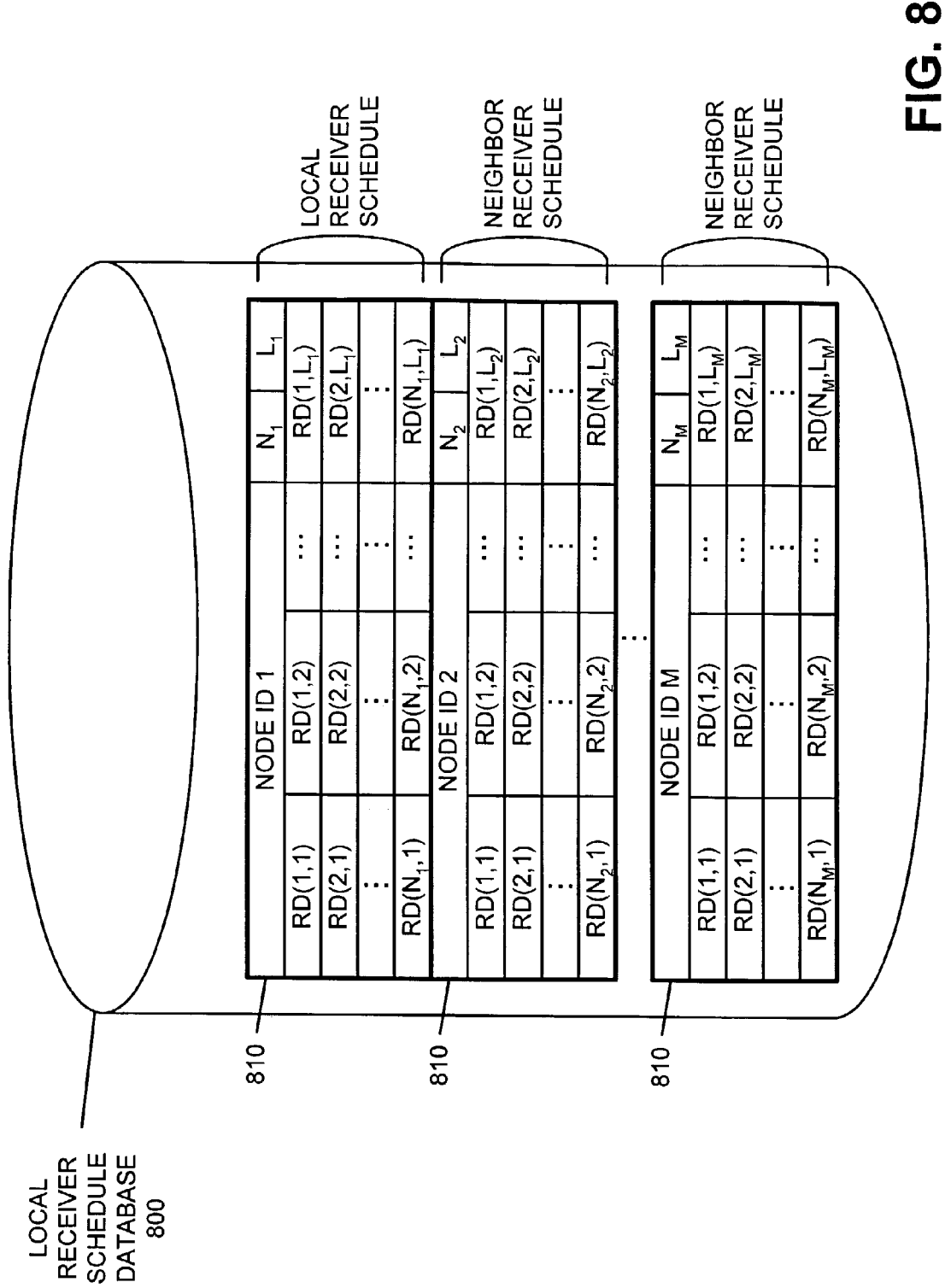
FIG. 8 depicts an exemplary local receiver schedule database that can be used to store receiver schedule information according to embodiments of the present invention.

As described above, node 120 of FIG. 2 can construct a receiver schedule message, such as receiver schedule message 700 of FIG. 7, from receiver schedule data stored within a local receiver schedule database (the local receiver schedule database in turn residing, for example, within RAM 270 of FIG. 2). FIG. 8 depicts an exemplary local receiver schedule database 800 consistent with implementations of the present invention. As shown, local receiver schedule database 800 includes a number M of pending receiver schedules 810. A first one of pending receiver schedules 810 can, for example, be a local pending receiver schedule for node 120 of FIG. 2, and all other pending receiver schedules 810 can, for example, be pending receiver schedules for other network nodes 120.

As shown, each pending receiver schedule 810 includes a node identification field (used to identify a particular node 120 to which schedule 810 applies), a reception definition count field (used to indicate a number N of reception definitions included in schedule 810), and a reception definition parameter count field (used to indicate a number L of parameters included in each reception definition in schedule 810). Additionally, each schedule 810 includes an N x L array of reception definition parameters (i.e., N rows of L parameters, each row corresponding to a single reception definition).

As described above, the medium and mode of communication between network nodes 120 will, in practice, dictate the number and type of parameters included in each reception definition. For example, in a standard radio frequency-hopping system, each reception definition can include just three parameters (i.e., a start time, a duration, and a carrier frequency). Note also that the number N of reception definitions per schedule, as well as the number L of parameters per reception definition, can be fixed and identical for all network nodes 120. If so, then pending receiver schedules 810 need not include the reception definition count field or the reception definition parameter count field shown in FIG. 8.

CONCLUSION

Systems and methods consistent with the present invention include network nodes that continually generate and broadcast next, or pending, portions of their respective receiver schedules. According to exemplary embodiments, certain aspects of the pending schedule portions are generated and updated in a pseudo-random fashion, and the pending schedule portions are transmitted along with data traffic among the network nodes. Each network node maintains a local receiver schedule database, including its own pending receiver schedule, as well as any pending receiver schedules received from other network nodes. To speed dissemination of receiver schedule information throughout the network, nodes transmit not only their own pending receiver schedules, but also those pending receiver schedules received from other network nodes. Since the pending receiver schedules for the various nodes are independently generated, continually updated, and rapidly disseminated, each node is able to set its own receiver schedule without consideration for any predefined scheduling plan. Embodiments are thus able to provide flexible, efficient and robust communication.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4, 5 and 6, the order of the acts can be varied in other implementations consistent with the present invention. Moreover, non-dependent acts can be implemented in parallel.

No element, act, or instruction used in the description of the present invention should be construed as critical or essential to the invention unless explicitly described as such. Also, as used herein, the article "a" is intended to include one or more items. Where only one item is intended, the term "one" or similar language is used. The scope of the invention is not limited to the foregoing description, and is instead defined by the claims and their equivalents.

What is claimed is:

1. A wireless network, comprising:
a node configured to periodically generate and transmit at least one reception definition, each of the at least one reception definition indicating a time and manner in which the node will operate to receive information messages, the time including a time at which the node will power up a receiver to receive the information messages where, when generating the at least one reception definition, the node is configured to derive parameters delineating each of the at least one reception definition via pseudo-random number generation or physical random number generation.

2. The wireless network of claim 1, wherein the node transmits a reception definition by including the reception definition with information messages bound for other network nodes.

3. The wireless network of claim 1, wherein the node is further configured to:
generate a local receiver schedule including a number of reception definitions,
periodically modify the local receiver schedule, and
transmit a prevailing local receiver schedule together with information messages bound for other network nodes.

4. The wireless network of claim 3, wherein, when modifying the local receiver schedule, the node is configured to:
periodically select a first reception definition from the local receiver schedule,
receive incoming information messages in accordance with the selected first reception definition,
remove the selected first reception definition from the local receiver schedule,
generate a new reception definition, and 5. The wireless network of claim 1, wherein the node is further configured to receive and subsequently transmit reception definitions generated and transmitted by other nodes.

6. The wireless network of claim 5 wherein the node generates the at least one reception definition based on at least one of the received reception definitions.

7. The wireless network of claim 5, wherein the node includes a local receiver schedule database configured to store reception definitions generated by the node and reception definitions received from the other nodes.

8. The wireless network of claim 7, wherein, when periodically transmitting reception definitions, the node is configured to:
analyze the local receiver schedule database to determine a next receiving node in the network,
determine whether any information messages are bound for the next receiving node, and
transmit at least a subset of the reception definitions stored in the local receiver schedule database together with at least one of the information messages bound for the next receiving node.

9. The wireless network of claim 7, wherein the local receiver schedule database is configured to store a data structure including at least one node receiver schedule.

10. The wireless network of claim 9, wherein each node receiver schedule in the data structure includes a node identification field and an array of reception definitions.

11. The wireless network of claim 10, wherein each reception definition in the data structure includes a reception start time, a reception duration, and a reception channel.

12. The wireless network of claim 1 wherein the time included in the at least one reception definition further includes a duration time period, the node being configured to power down the receiver after the duration time period has lapsed.

13. A node for use in a wireless network, comprising:
a memory configured to store instructions, and
a processor configured to execute the instructions to:
generate a local receiver schedule including a number of reception definitions, each reception definition indicating a time and manner in which the node will operate to receive information messages, the time including a time at which the node will power up a receiver to receive the information messages,
periodically modify the local receiver schedule, and
cause a prevailing local receiver schedule to be transmitted together with information messages bound for other nodes in the wireless network.

14. The node of claim 13, wherein, when periodically modifying the local receiver schedule, the processor is configured to:
select a first reception definition from the local receiver schedule,
receive incoming information messages in accordance with the selected reception definition,
remove the selected reception definition from the local receiver schedule,
generate a new reception definition, and
append the new definition to the local receiver schedule.

15. The node of claim 13, wherein, when causing a prevailing local receiver schedule to be transmitted together with information messages bound for other nodes in the wireless network, the processor is configured to:
identify a next receiving node from among the other nodes in the wireless network, determine whether an information message is bound for the identified next receiving node, and when an information message is bound for the identified next receiving node, cause the prevailing local receiver schedule to be transmitted together with at least one information message to the identified next receiving node.

16. The node of claim 15, further comprising a local receiver schedule database configured to store reception definitions generated by the node and reception definitions received by the node from other nodes in the wireless network.

17. The node of claim 16 wherein the processor generates the local receive schedule based on the received reception definitions.

18. The node of claim 16, wherein, when identifying the next receiving node, the processor is configured to analyze the local receiver schedule database to determine an earliest start time among stored reception definitions associated with other network nodes.

19. The node of claim 16, wherein, when causing the prevailing local receiver schedule to be transmitted together with at least one information message to the identified next receiving node, the processor is configured to additionally cause reception definitions associated with other network nodes to be transmitted together with at least one information message to the identified next receiving node.

20. The node of claim 16, wherein the local receiver schedule database is configured to store a data structure including at least one node receiver schedule.

21. The node of claim 20, wherein each node receiver schedule in the data structure includes a node identification field and an array of reception definitions.

22. The node of claim 21, wherein each reception definition in the data structure includes a reception start time, a reception duration, and a reception channel.

23. The node of claim 13 wherein the time indicated in the reception definition further includes a duration time period, the processor being configured to power down the receiver after the duration time period has lapsed.

24. A method of performing receiver scheduling at a node in a wireless network, the wireless network including a plurality of nodes, the method comprising:

generating a local receiver schedule at the node, the local receiver schedule including a number of reception definitions, each reception definition indicating a time and manner in which the node will operate to receive information messages from other nodes in the network, the time including a time at which the node will power up a receiver to receive the information messages;

periodically updating the local receiver schedule at the node; and periodically transmitting a most recently updated local receiver schedule from the node to other nodes in the network.

25. The method of claim 24, wherein periodically updating the local receiver schedule includes:

selecting a first reception definition from the local receiver schedule, receiving incoming information messages in accordance with the selected definition, removing the selected reception definition from the local receiver schedule, generating a new reception definition, and appending the new reception definition to the local receiver schedule.

26. The method of claim 24, wherein transmitting a most recently updated local receiver schedule from the node to other nodes in the network includes:

identifying a next receiving node among the other nodes in the wireless network, and transmitting the most recently updated local receiver schedule together with at least one information message bound for identified next receiving node.

27. The method of claim 24 wherein the time indicated in the reception definition further includes a duration time period, the node being configured to power down the receiver after the duration time period has lapsed.

28. A computer readable medium encoded with instructions for controlling at least one node to perform a method, comprising:

generating a local receiver schedule, the local receiver schedule including a number of reception definitions, each reception definition indicating a time and manner in which the node will operate to receive information messages, the time including a time at which the node will power up a receiver to receive the information messages;

periodically updating the local receiver schedule; and causing a most recently updated local receiver schedule to be transmitted together with information messages bound for other network nodes.

29. The computer-readable medium of claim 28 wherein the time indicated in the reception definition further includes a duration time period, the node being configured to power down the receiver after the duration time period has lapsed.

* * * * *